(12) United States Patent
Avakian

(10) Patent No.: US 8,674,010 B2
(45) Date of Patent: Mar. 18, 2014

(54) BLENDS OF NANOCOMPOSITES AND THEIR USE

(75) Inventor: Roger W. Avakian, Aurora, OH (US)

(73) Assignee: PolyOne Corporation, Avon Lake, OH (US)

( * ) Notice: Subject to any disclaimer, the term of this patent is extended or adjusted under 35 U.S.C. 154(b) by 1232 days.

(21) Appl. No.: 11/722,371

(22) PCT Filed: Dec. 22, 2005

(86) PCT No.: PCT/US2005/046988
§ 371 (c)(1),
(2), (4) Date: Jun. 21, 2007

(87) PCT Pub. No.: WO2006/071833
PCT Pub. Date: Jul. 6, 2006

(65) Prior Publication Data
US 2008/0188587 A1    Aug. 7, 2008

Related U.S. Application Data

(60) Provisional application No. 60/639,861, filed on Dec. 28, 2004.

(51) Int. Cl.
*C08K 3/34*    (2006.01)

(52) U.S. Cl.
USPC .......... 524/445; 524/447; 524/514; 524/515; 524/543; 524/442

(58) Field of Classification Search
USPC ................. 524/445, 447, 514, 515, 543, 442
See application file for complete search history.

(56) References Cited

U.S. PATENT DOCUMENTS

| | | | | |
|---|---|---|---|---|
| 5,385,776 A | * | 1/1995 | Maxfield et al. | 428/297.4 |
| 5,972,448 A | * | 10/1999 | Frisk et al. | 428/35.7 |
| 6,486,253 B1 | * | 11/2002 | Gilmer et al. | 524/445 |
| 6,610,770 B1 | * | 8/2003 | Ross et al. | 524/445 |
| 7,270,862 B2 | * | 9/2007 | Flat et al. | 428/35.7 |
| 2004/0106719 A1 | * | 6/2004 | Kim et al. | 524/445 |
| 2005/0215694 A1 | * | 9/2005 | Kim et al. | 524/445 |
| 2005/0228102 A1 | * | 10/2005 | Tomova et al. | 524/442 |

FOREIGN PATENT DOCUMENTS

| | | | | |
|---|---|---|---|---|
| WO | 0078540 | | 12/2000 | |
| WO | WO 03/055792 | * | 7/2003 | B82B 3/00 |
| WO | WO 03/097738 | * | 11/2003 | C08L 23/06 |

* cited by examiner

*Primary Examiner* — Peter F Godenschwager
*Assistant Examiner* — Jane L Stanley
(74) *Attorney, Agent, or Firm* — John H. Hornickel

(57) ABSTRACT

A blend of nanocomposites is disclosed, with a polyolefin nanocomposite preferably serving as a continuous phase and a polyamide nanocomposite preferably serving as a discontinuous phase. The exfoliated nanoclay in both nanocomposites contributes stiffness, toughness and flame retardancy to the blend. Other optional ingredients include conventional essentially halogen-free flame retardants, intumescent essentially halogen-free flame retardants, and other typical polymer compounding additives. The compound can be processed as a thermoplastic into any practical article needing stiff, tough, and flame retardancy properties.

8 Claims, No Drawings

BLENDS OF NANOCOMPOSITES AND THEIR USE

CLAIM OF PRIORITY

This application claims priority from U.S. Provisional Patent Application Ser. No. 60/639,861 filed on Dec. 28, 2004.

FIELD OF THE INVENTION

This invention relates to a blend of two different compounds, each containing exfoliated nanoclay.

BACKGROUND OF THE INVENTION

Nanoclays are exciting additives for a variety of purposes. U.S. Pat. Nos. 6,376,591; 6,251,980; 6,232,388; 6,225,394; 6,090,734; 6,050,509; 5,998,528; 5,844,032; and 5,837,763 disclose the manufacture and use of nanocomposites, which are exfoliated nanoclays in a plastic matrix. Nanocor, Inc. is a significant commercial source of exfoliated or intercalated nanoclays and has a web site: www.nanocor.com. Also Poly-One Corporation (www.polyone.com) is a source of Nanoblend™ nanoclay concentrates for use in polyolefin compounds and Maxxam® LST nanocomposite compounds.

SUMMARY OF THE INVENTION

What the art needs is a blend of physical and chemical properties for nanocomposites.

The present invention solves that problem in the art by providing a blend of a nanocomposite having a polyamide matrix and a nanocomposite having a polyolefin matrix.

One aspect of the present invention is a polymer blend, comprising (a) a polyolefin nanocomposite and (b) a polyamide nanocomposite.

Another aspect of the present invention is an article made from the polymer blend described immediately above.

A feature of the present invention is that the polymer blend has properties contributed by both the polyolefin nanocomposite component and the polyamide nanocomposite component.

An advantage of the present invention is that the blend can exhibit better properties than either of the nanocomposites individually, e.g., improved thermal properties, such as higher heat deflection temperature.

Additional features and advantages will be identified below.

EMBODIMENTS OF THE INVENTION

Nanoclay

Nanoclay is a clay from the smectite family. Smectites have a unique morphology, featuring one dimension in the nanometer range. Montmorillonite clay is the most common member of the smectite clay family. The montmorillonite clay particle is often called a platelet, meaning a sheet-like structure where the dimensions in two directions far exceed the particle's thickness.

Nanoclay becomes commercially significant if intercalated with an intercalant, becoming what is also known as an organoclay. An intercalate is a clay-chemical complex wherein the clay gallery spacing has increased, due to the process of surface modification by an intercalant. Under the proper conditions of temperature and shear, an intercalate is capable of exfoliating in a resin matrix. An intercalant is an organic or semi-organic chemical capable of entering the montmorillonite clay gallery and bonding to the surface. Exfoliation describes a dispersion of a surface treated nanoclay in a plastic matrix. In the present invention, the intercalated nanoclay (i.e., organoclay) is exfoliated in the polyolefin on the one hand and in the polyamide on the other hand, by dispersion throughout.

In exfoliated form, nanoclay platelets have a flexible sheet-type structure which is remarkable for its very small size, especially the thickness of the sheet. The length and breadth of the particles range from 1.5 μm down to a few tenths of a micrometer. However, the thickness is astoundingly small, measuring only about a nanometer (a billionth of a meter). These dimensions result in extremely high average aspect ratios (200-500). Moreover, the miniscule size and thickness mean that a single gram contains over a million individual particles.

Nanocomposites are the combination of the surface treated nanoclay and the plastic matrix. In polymer compounding, a nanocomposite concentrate is a very convenient means of delivery of the nanoclay into the ultimate compound, provided that the plastic matrix is compatible with the principal polymer resin components of the compounds. In such manner, nanocomposites are available in concentrates, masterbatches, and compounds from Nanocor, Inc. of Arlington Heights, Ill. (www.nanocor.com) and PolyOne Corporation of Avon Lake, Ohio (www.polyone.com) in a variety of nanocomposites.

Polyolefin Nanocomposite

"Polyolefin" includes homopolymers, copolymers, blends of polymers, mixtures of polymers, alloys of polymers, and combinations thereof, where at least one of the polymers is polymerized from an olefin monomer having from 2 to about 8 carbon atoms.

Within the broad definition above, non-limiting examples of polyolefins suitable for the present invention include polyethylene (including low-density (LDPE), high-density, high molecular weight (HDPE), ultra-high molecular weight (UH-DPE), linear-low-density (LLDPE), very-low density, etc.), maleated polypropylene, polypropylene, polybutylene, polyhexene, polyoctene, and copolymers thereof, and ethylene-vinyl-acetate (EVA) copolymer, and mixtures, blends or alloys thereof.

Particularly preferred is a blend of an olefin copolymer with a maleated polypropylene. The olefin copolymer is an ethylene-propylene copolymer, commercially available from Dow Chemicals under the Inspire brand. The maleated polypropylene is capable of increasing dispersion of nanoclay into the polyolefin, commercially available from Crompton Corporation under the Polybond brand.

Optionally, the polyolefin nanocomposite can have impact modifiers included therein. Impact modifiers are typically elastomers such as natural rubber, polyisoprene rubber, styrene-butadiene rubber, polybutadiene rubber, nitrile rubber, butyl rubber, ethylene-propylene-diene rubber (EPDM), ethylene-octene copolymers, and other elastomers. Minor amounts of impact modifiers can alter the impact strength according to preferences of those skilled in the art, to be determined without undue experimentation. For example, polybutadiene rubber, ethylene-propylene-diene rubber (EPDM), ethylene-octene copolymers, and other elastomers are useful. Non-limiting examples of such elastomers are those commercially available from multinational companies such as Bayer, Dupont-Dow Elastomers, Uniroyal Chemical, ExxonMobil, and others. ENGAGE™ 8180, ENGAGE™ 8842, and other ENGAGE™ polyolefin elastomers are especially preferred ethylene-octene copolymers available from DuPont Dow Elastomers LLC of Wilmington, Del. that function well as impact modifiers for nanocomposites of the invention.

Commercially available polyolefin nanocomposites can be used in the polymer blends of the present invention. A particularly preferred impact modified polyolefin nanocomposite is sold by PolyOne Corporation as Maxxam® LST nanocomposite, wherein the LST is an acronym for light, stiff, and tough.

The weight percent of intercalated nanoclay in the polyolefin nanocomposite can range from about 0.5 to about 50 weight percent, and preferably from about 4 to about 15 weight percent. Preferably, the intercalated nanoclay is from Nanocor, Inc. marketed under the Nanomer™ brand with product numbers I44P, I30P, and I24, depending on the type of intercalant used.

Polyamide Nanocomposite

"Polyamide" includes homopolymers, copolymers, blends of polymers, mixtures of polymers, alloys of polymers, and combinations thereof, where at least one of the polymers is polymerized from condensation of an diacid monomer having from 2 to about 20 carbon atoms and a diamine monomer having from 2 to about 20 carbon atoms, including without limitation cyclic lactam monomers having from 3 to 12 carbon atoms.

Suitable polyamides include partially aromatic polyamides, aliphatic polyamides, wholly aromatic polyamides and/or mixtures thereof. By "partially aromatic polyamide," it is meant that the amide linkage of the partially aromatic polyamide contains at least one aromatic ring and a nonaromatic species. Suitable polyamides have an article forming molecular weight and preferably an I.V. of greater than 0.4.

Preferred wholly aromatic polyamides comprise in the molecule chain at least 70 mole % of structural units derived from m-xylylene diamine or a xylylene diamine mixture comprising m-xylylene diamine and up to 30% of xylylene diamine and an aliphatic dicarboxylic acid having 6 to 10 carbon atoms.

Polyamides formed from isophthalic acid, terephthalic acid, cyclohexanedicarboxylic acid, meta- or para-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred partially aromatic polyamides include, but are not limited to poly(m-xylylene adipamide), poly(m-xylylene adipamide-co-isophthalamide), poly(hexamethylene isophthalamide), poly(hexamethylene isophthalamide-co-terephthalamide), poly(hexamethylene adipamide-co-isophthalamide), poly(hexamethylene adipamide-co-terephthalamide), poly(hexamethylene isophthalamide-co-terephthalamide) and the like or mixtures thereof. More preferred partially aromatic polyamides include poly(m-xylylene adipamide), poly(hexamethylene isophthalamide-co-terephth-alamide), poly(m-xylylene adipamide-co-isophthalamide), and/or mixtures thereof. The most preferred partially aromatic polyamide is poly(m-xylylene adipamide).

Preferred aliphatic polyamides include, but are not limited to poly(hexamethylene adipamide) and poly(caprolactam). The most preferred aliphatic polyamide is poly(caprolactam). Partially aromatic polyamides are preferred over the aliphatic polyamides where good thermal properties are crucial.

Preferred aliphatic polyamides include, but are not limited to polycapramide (nylon 6), poly-aminoheptanoic acid (nylon 7), poly-aminonanoic acid (nylon 9), polyundecaneamide (nylon 11), polyaurylactam (nylon 12), poly(ethylene-adipamide) (nylon 2,6), poly(tetramethylene-adipamide) (nylon 4,6), poly(hexamethylene-adipamide) (nylon 6,6), poly(hexamethylene-sebacamide) (nylon 6,10), poly(hexamethylene-dodecamide) (nylon 6,12), poly(octamethylene-adipamide-) (nylon 8,6), poly(decamethylene-adipamide) (nylon 10,6), poly(dodecamethylene-adipamide) (nylon 12,6) and poly(dodecamethylene-seb-acamide) (nylon 12,8).

The most preferred polyamides include poly(m-xylylene adipamide), polycapramide (nylon 6) and polyhexamethylene-adipamide (nylon 6,6). Poly(m-xylylene adipamide) is a preferred polyamide due to its availability, high barrier, and processability.

The polyamides are generally prepared by processes that are well known in the art. It is also well known in the art to manufacture nanocomposites by polymerizing a polyamide monomer while in contact with a layered silicate material, e.g., a sodium smectite clay, that has been treated with a swelling agent, such as an onium ion, to form a nylon polymer-intercalated layered silicate dispersed in additional (non-intercalated) melted polymerized nylon (matrix polymer), e.g., see Toyota U.S. Pat. No. 4,739,007 (RE 37,385).

The weight percent of intercalated nanoclay in the polyamide nanocomposite can range from about 1 to about 50 weight percent, and preferably from about 2 to about 10 weight percent. Preferably, the intercalated nanoclay is from Nanocor, Inc. marketed under the Nanomer™ brand with product numbers I44P, I30P, and I24, depending on the type of intercalant used.

Optionally, the polyamide nanocomposite can also have impact modifiers included therein. Impact modifiers are typically elastomers such as natural rubber, polyisoprene rubber, styrene-butadiene rubber, polybutadiene rubber, nitrile rubber, butyl rubber, ethylene-propylene-diene rubber (EPDM), ethylene-octene copolymers, and other elastomers. But also, the impact modifiers can include the combination as disclosed in European Patent Publication EP 1207172A2 of a compound of a core/shell additive and a linear copolymer of olefin, alkyl acrylate, and glycidyl methacrylate monomers. Moreover, the impact modifier can be a tri-block copolymer constructed of three linear chains covalently bonded to one another: an aromatic monomer, an olefin monomer, and an alkyl (meth)acrylate monomer, such as disclosed in PCT Patent Publications WO 99/029772 and WO 02/066556. Such tri-block copolymers are commercially available such as the styrene-butadiene-methylmethacrylate family of products commercially available as "SBM" from Atofina Chemicals, Inc., nka Arkema, of Philadelphia, Pa.

Such tri-block copolymer impact modifier can be included in the polyamide nanocomposite in an amount from about 3 to about 25, and preferably from about 5 to about 20 weight percent of the polyamide nanocomposite. Most preferably, the amount is about 10 to about 15 weight percent of the nanocomposite.

If impact modifier is to be included in the polyamide nanocomposite, then the compatibilizer of the present invention is selected from the group consisting of thermoplastic elastomers, maleic anhydride terpolymers, and combinations thereof. The thermoplastic elastomer can be a rubber-modified graft copolymer, such as a styrenic block copolymer.

Styrenic block copolymers are well known as having a styrenic end blocks and olefinic midblocks. The combination of styrenic and olefinic blocks provides a non-crosslinked thermoplastic elastomer polymer. Commercially available styrenic block copolymers are Kraton brand copolymers from Kraton Company. Among the commercial offerings are Kraton G, Kraton D, Kraton FG, and Kraton A copolymers. Preferably, Kraton FG 1901X brand styrene/ethylene-butene-1/styrene triblock copolymer rubber modified with maleic anhydride copolymer can be used.

Alternatively, a terpolymer of olefinic monomer, acrylate monomer, and maleic anhydride can be used as the compatibilizer. Preferably, Lotader MAH brand random ethylene/acrylic ester/maleic anhydride terpolymers from Atofina can be used. These terpolymers are produced by a high pressure polymerization process.

The compatibilizer can be included in the compound of the present invention in an amount from about 1 to about 10, and preferably from about 5 weight percent of the polyamide nanocomposite.

Commercially available polyamide nanocomposites can be used in the polymer blends of the present invention. A particularly preferred polyamide nanocomposite is sold by PolyOne Belgium, S.A. as Bergamid™ nanocomposite. The Bergamid™ nanocomposite family includes both impact modified and unmodified polyamide nanocomposites.

Table 1 shows ranges of acceptable, desirable, and preferred weight percents of the two nanocomposites, relative to the total weight of the blend, all being expressed in approximate values, for a preferred embodiment of the invention of Maxxam® LST 5571 polypropylene nanocomposite and Bergamid™ polyamide nanocomposite.

TABLE 1

Weight Percent of Nanocomposite Ingredients to Total Blend

| Polymer | Acceptable (Wt. %) | Desirable (Wt. %) | Preferred (Wt. %) |
|---|---|---|---|
| Polyamide Nanocomposite | 10--90 | 15--70 | 20--40 |
| Polypropylene Nanocomposite | 90--10 | 85--30 | 80--60 |

The variations in weight percent of the two nanocomposites determine whether which nanocomposite is a continuous phase. Generally, one desires for the continuous phase to exhibit the dominant physical and chemical properties desired for the final blend formed into an article. Thus, the discontinuous phase nanocomposite can be considered to modify the properties of the continuous phase nanocomposite.

In the present invention, either nanocomposite can serve as the continuous phase. However, it is presently preferred for the polypropylene nanocomposite to serve as the continuous phase because of its superior chemical resistance, ultra-violet light resistance, more facile processing and lower cost.

Optional Additional Ingredients

Either nanocomposite or both can have optional additional ingredients to further affect the physical or chemical properties of either or both nanocomposites. The optional additional ingredients can be the same or can be different when both nanocomposites contain them. Without undue experimentation, those of ordinary skill in the polymer compounding art can determine which optional ingredients and in which amounts are suitable for either or both nanocomposites.

Introduction of optional additional ingredients into one or both nanocomposites preferably occurs prior to blending of the nanocomposites so as to assure the location of the optional additional ingredients within the correct phase of the polymer blend. Alternatively, one can add an optional ingredient(s) during blend processing with reliance on affinity of the ingredient(s) for one polymer more than the other polymer, using for example an HLB (hydrophilic/lipophilic balance) value to determine whether an ingredient will migrate toward the generally hydrophilic polyamide or toward the generally lipophilic polyolefin.

Optional Flame Retardants

Optionally, flame retardants can be added to either or both nanocomposites of the present invention. Essentially halogen-free flame retardants are preferred because halogens are not emitted during combustion.

Any conventional flame retardant that is essentially halogen-free is suitable for the present invention. Non-limiting examples of flame retardants include metal hydroxides, metal borates, antimony oxides, aryl phosphates, molybdate salts, ammonium polyphosphate, melamines, acid generating salts, silicones, and combinations thereof. Of these, aluminum trihydrate (ATH), magnesium hydroxide, and tri-tolyl phosphate are particularly preferred.

The amount of optional conventional flame retardant can be added in an amount from 0 to about 50 weight percent, and preferably from 0 to about 30 weight percent of the total nanocomposite.

Intumescent flame retardants are also optional additives in the present invention. Providing intumescence to a polyolefin polymer typically requires, as explained in U.S. Pat. No. 6,632,442 (Chyall et al.), an acid source, a carbonific and spumific or nitrogen source component. These components may be in the same chemical compound. For example, ammonium polyphosphate will function as both an acid source and a nitrogen source as will be readily appreciated by one of skill in the art. Likewise, pentaerythritol phosphate alcohol (PEPA) functions as both an acid source and a carbonific. Melamine phosphate can provide carbon for the char, nitrogen for foaming and acid to catalyze dehydration and thus is a particularly preferred ingredient.

In some embodiments, the acid source and nitrogen source are supplied in whole or in part by way of a single chemical compound selected from the group consisting of: ammonium phosphate, ammonium polyphosphate, ammonium pyrophosphate and mixtures thereof.

Flame retardant polymer compositions are those that foam and char to provide flame resistance, typically increasing in volume by more than 50 percent, preferably on the order of 100 percent based on the unreacted volume of the composition. The compositions thus typically include an acid catalyst source, a nitrogen source and a carbonific which may be the matrix polyolefin polymer itself or may be a polyol, or may be provided by way of a multifunctional ingredient such as pentaerythritol phosphate alcohol.

Acid sources may be borates, sulfates, sulfites, nitrates, phosphates, phosphonates, melamine or other salts of the foregoing, and so forth.

Additional examples of flame retardant phosphorus-containing flame retardants include melamine salts of organophosphates such as melamine phenyl phosphate and melamine amyl phosphate.

There are many commercially available sources of intumescent flame retardant materials, in any of the combinations described above. A preferred commercial source of flame retardant material is Amfine Chemical Corporation of Allendale, N.J., and particularly its Amfine FP 2000 brand nitrogen-phosphorous based flame retardant product.

The amount of optional intumescent flame retardant can be added in an amount from 0 to about 40 weight percent, and preferably from 0 to about 30 weight percent of the total nanocomposite.

Further, any metal salt of an organic sulfonic acid which provides flame retardant activity in a polyolefin can be used in the polyolefin nanocomposite. Examples of such cationic moieties of flame retardant compounds include alkali and alkaline earth metal salts such as sodium, potassium, calcium, barium and the like.

The organic moiety of the salt is generally an aromatic or perfluoro halogenated group with a sulfonic acid substituent. Examples of such organic moieties include perfluoro butyl sulfonic acid, perfluorooctyl sulfonic acid, benzene sulfonic acid, trichlorobenzene sulfonic acid, p-benzene sulfonyl benzene sulfonic acid and the like.

Examples of patents disclosing such salts include U.S. Pat. Nos. 3,933,734; 3,931,100; 3,948,851; 3,953,396; 3,926,908; 3,909,490; 3,919,167; and 4,066,618. Of these various metal salts of organic sulfonic acids, sodium trichlorobenzene sulfonate (STB) or potassium diphenyl sulfone sulfonate (KSS) is preferred. Of STB and KSS, KSS is preferred and is commercially available from Seal Sands Chemicals Ltd. of Middlesbrough, U.K.

Any amount of flame retardant agent which is effective to flame retard polyolefin and which is sufficient to cause the observed severe melt degradation when employed in combination with organoclay is within the scope of the invention. The minimum amount of flame retardant in such compositions which experience the severe melt degradation is dependent upon the specific composition components employed.

Other Optional Additives

As with any polymeric resin-based compound, optional additives can provide easier processing and more desirable final appearance and properties for the compound. The situation is no different for a polymer blend of two different compounds.

Non-limiting examples of optional additives include impact modifiers, fillers, antioxidants, stabilizers, lubricants, pigments, biocides, and the like, and combinations thereof. None of these ingredients is essential to the performance of either nanocomposite. But each of them can provide added value to the final polymer blend when included for their intended purpose. Each of these additives is commercially available from well-known sources known to those skilled in the art.

For example, impact modifiers can range from 0 to about 20, and preferably about 0.5 to 12 weight percent of the blend of the nanocomposites.

For example, fillers can range from 0 to about 40, and preferably from about 2 to about 20 weight percent of the blend of the nanocomposites.

Antioxidants can range from 0 to about 0.5, and preferably from about 0.05 to about 0.3 weight percent of the blend of the nanocomposites.

Ultra-violet light stabilizers can range from 0 to about 5, and preferably from about 0.35 to about 3 weight percent of the blend of the nanocomposites.

Lubricants can range from 0 to about 2, and preferably from about 0.7 to about 1.5 weight percent of the blend of the nanocomposites.

Pigments can range from 0 to about 20, and preferably from about 2 to about 5 weight percent of the blend of the nanocomposites.

Biocides can range from 0 to about 5, and preferably from about 0.5 to about 3 weight percent of the blend of the nanocomposites.

Method of Processing Polyolefin Nanocomposite

The preparation of polyolefin nanocomposites uses extrusion mixing equipment known to those skilled in the art, such as disclosed in U.S. Pat. No. 6,632,868 (Qian et al.) Two alternative means of processing are available.

In the first means, a concentrate is made by mixing thermoplastic polyolefin (TPO) and nanoclay, and optionally a compatibilizing dispersion agent such as maleated polypropylene (PP-g-MAH).

In the second means, the TPO is not used in forming the concentrate. Rather, the constituents of the TPO, (i.e., PP and an elastomer, particularly a polyolefin elastomer), are added separately and at different locations in the extruder. More specifically, the polyolefin elastomer is added downstream of the other ingredients, which gives the nanoclay and its optional dispersion agent both more time and less interference in dispersing completely within the polypropylene carrier.

Preferably, the mixing equipment is a co-rotating twin-screw extruder commercially available from Werner-Pfleiderer. The extruder should be capable of screw speeds ranging from about 50 to about 2,000 rpm. The temperature profile from the barrel number two to the die should range from the melting temperature of the thermoplastic matrix polymer to about 270° C., and preferably from around 200° C. for this nanoconcentrate. The nanocomposite can be pelletized for later use in the blend of the present invention.

Method of Processing Polyamide Nanocomposite

The polyamide nanocomposite of the present invention can be prepared by melt reactive extrusion process, which makes it possible to vary such extrusion parameters as temperature profile, screw design, output rate, rpm, etc to achieve homogeneous dispersion of any optional impact modifier on the scale less than 1 micrometer.

With organoclay present, in-situ polymerization procedure of caprolactam (cyclic compounds represented, which undergo ring-opening polymerization to form polyamides), is used to intercalate the nanoclay with polyamide polymerized from caprolactam, according to the teachings of U.S. Pat. No. 4,739,007.

Mixing of caprolactam with the treated nanoclay can be achieved by two different methods.

In the "wet" method, caprolactam can be dissolved in water preheated up to 90° C., and then Nanomer I.24TL powder from Nanocor, Inc. can be incorporated in a separate tank to the mixture of molten caprolactam and 3-4 wt % of water in a nitrogen atmosphere. The mixture can then be introduced to the reaction tank. Polymerization is typically carried out at 275° C. for 6-9 hours under the pressure of 5-6 bar.

In the dry method, I.24TL powder is pre-blended with dry caprolactam powder. The mixture obtained in the mixing step may be immediately heated to cause polymerization. The mixer should be capable of mixing speeds ranging from about 50 to about 1000 rpm. The temperature profile from the mixer should range from about 170° C. to about 280° C., and preferably from about 220° C. to about 275° C., depending on the ingredients.

The powder mixture can then be added to the reactor for polymerization. The final step is to polymerize the mixture obtained in the mixing step above by heating it to a prescribed temperature, thereby giving an intended compound of this invention. Ring opening polymerization can be carried out in the temperature range from 200° C. 300° C., preferably between 250° C. and 300° C., and most preferably at 250° C. for rapid progress of polymerization. Suitable polymerization time, though different depending on the level of clay and polymerization temperature, is preferably in the range from 5 to 24 hours. To be more specific, polymerization at 250° C. can be put to completion in about four hours when an 5% of organic nanoclay is used as swelling agent, but it requires 8 to 12 hours for completion when an 8% clay was incorporated. The resultant mixture consisted of PA-6/Nanoclay with 8-9% residual caprolactam. Residual caprolactam was washed with water at 100° C. for 24 hours. Nano-nylon was dried in vacuum for 30 hours at 115° C.

Compounds of the present invention can be made by either method. Products made were PA-6 nanocomposite with 5 weight percent of organoclay (Nanocor I.24TL powder) using both wet and dry methods, and with 8 weight percent I.24TL using the dry method.

After polymerization of polyamide in the presence of organoclay final PA-6/nanoclay composite (Nano-Nylon) can be compounded with SBM triblock-copolymer as impact modifier and SEBS-MAH or Lotader 3410 as compatibilizer using ZSK 25 Twin Screw extruder. The composite materials obtained according to the procedure detailed above may be directly injection-molded or extruded into finish articles, or may be mixed with polyamides or other types of polymers before molding.

As an example, extrusion can be carried out in a suitable extruder, such as a Werner-Pfleiderer 25 mm co-rotating twin screw extruder. The extruder should be capable of screw speeds ranging from about 50 to about 12000 rpm. The temperature profile from the barrel number two to the die should range from about 200° C. to about 280° C., and preferably from about 210° C. to about 270° C., depending on the ingredients of the melt.

The extrudate can be pelletized for later use in the blend of the present invention.

Blending of the Two Nanocomposites

Blending of the polyolefin nanocomposite with the polyamide nanocomposite can use conventional batch or continuous processing equipment for thermoplastic materials according to preferences of those familiar with the compounding of thermoplastic materials. In one route, each ingredient is mixed into a large vessel. In another route, batches of ingredients are first formed and then the batches are combined.

Batch processors such as Banbury mixers, helicones, and other conventional reactors can be used, with temperatures ranging from about 200° C. to about 300° C., and preferably from about 220° C. to about 260° C. and mixing speeds ranging from about 10 to about 500 revolutions per minute and preferably from about 100 to about 250 rpm.

Continuous processors such as extruders, Farrell brand continuous mixers, etc. can also be used, with temperatures ranging from about 200° C. to about 300° C., and preferably from about 220° C. to about 260° C. and mixing speeds ranging from about 100 to about 2000 revolutions per minute and preferably from about 250 to about 700 rpm.

As preferred in the present invention, the following well-known steps can be employed in the following sequence: blenders containing ingredients feeding a hopper upstream from an extruder, usually twin-screw, co-rotating. The ingredients are thoroughly mixed under sufficient heat to disperse the two nanocomposites and optional other ingredients identified above.

Preferably, the mixing equipment is a co-rotating twin-screw extruder commercially available from Werner-Pfleiderer. The extruder should be capable of screw speeds ranging from about 50 to about 2,000 rpm. The temperature profile from the barrel number two to the die should range from the melting temperature of the thermoplastic matrix polymer to about 270° C., and preferably from around 200° C. for this polymer blend. The blend of nanocomposites can be pelletized for later use in the formation of articles as described below.

Usefulness of the Invention

Using conventional extrusion, molding, calendering, or other form-generating production equipment, the blend of the present invention can be made into a variety of forms. The properties of the respective nanocomposites in the blend reside throughout the mass of the compound, whatever its form. Non-limiting examples of forms are films, profiles, articles, fibers, and the like.

Films can have dimensions ranging from about 0.2 mm to about 0.5 mm (8 to 20 mils), and preferably from about 0.2 mm to about 0.3 mm in thickness and ranging from about 40 cm to about 187 cm (16 to 74 inches), and preferably from about 71 cm to about 162 cm in width. Length is generally dependent on the size of a roll of the film. Films can be solid or be a membrane, depending on means of formation according to techniques known to those of skill in the art. Films can be reinforced or unreinforced, according to techniques known to those skilled in the art.

Profiles can also be made from extrusion of blends of the present invention of any three-dimensional shape according to the shape of the profile die used during extrusion.

Articles can be made from a mold using blends of the present invention according to any cavity shape of the mold, whether male or female and whether formed via heat, heat and pressure, heat and vacuum, or the like.

Fibers can be made of the blends of the present invention, whether in the form of woven fibrous structures or nonwoven fibrous structures, according to production techniques known to those skilled in the art.

Articles made from blends of the present invention are more valuable because nanoclays provide increased lightness and stiffness while retaining toughness and also contribute to flame retardancy. Such articles can be made into any number of shapes, among them, automobile parts, large appliance parts, and the like.

Regardless of desired form, made using teachings from encyclopedia, technical literature, or patent literature, the physical and chemical properties of the continuous phase of the blend, as modified by the physical and chemical properties of the discontinuous phase of the blend, drive which form is employed.

The following examples further explain the invention.

EXAMPLES

Examples 1-7 and Comparative Examples A-G

Nanoclay-containing flame retardant compounds were prepared using commercial sources stated in Table 2 and the mixing conditions stated in Table 3.

TABLE 2

Commercial Sources

| Ingredient and Use | Source | Brand(s) |
| --- | --- | --- |
| Polypropylene nanocomposite (Impact Modified) | PolyOne Corporation | Maxxam ® LST 5571 |
| Nylon 6 | Various | Various |
| Polyamide nanocomposite (Impact Modified) | PolyOne Belgium S.A. | Bergamid ™ |
| PP-g-MAH (maleated polypropylene) to disperse nanoclay | Crompton | PolyBond PBX5104 |
| Impact modifier | Crompton | Royaltuf |
| Phosphite/phenolic process stabilizer | Ciba | B225 |

TABLE 3

Blend Making Conditions

| | |
| --- | --- |
| Mixing Equipment | Werner & Pfleiderer ZSK 25 co-rotating twin screw extruder |
| Mixing Temperature | 200° C. |
| Mixing Speed | 500 rpm |
| Order of Addition | Introduced at the inlet in no particular order |

Table 4 shows the recipes employed and the results of three standard tests for polymer compound performance. The difference in recipe between Example 1 and Comparative Example A is the use of Bergamid™ polyamide nanocomposite in place of nylon 6. This replacement is repeated for Examples 2-7 and B-G, respectively.

TABLE 4

| | 1 | A | 2 | B | C | 3 | 4 | D | 5 | E | 6 | F | G | 7 |
|---|---|---|---|---|---|---|---|---|---|---|---|---|---|---|
| Ingredients in Weight Percent | | | | | | | | | | | | | | |
| Maxxam LST 5571 | 66.5 | 65.9 | 69.2 | 68.1 | 75.2 | 77.8 | 88.3 | 88.9 | 89.4 | 88.8 | 66.7 | 67.8 | 90.0 | 89.5 |
| Nylon 6 | 0.0 | 26.4 | 0.0 | 27.2 | 18.8 | 0.0 | 0.0 | 8.9 | 0.0 | 8.9 | 0.0 | 27.1 | 9.0 | 0.0 |
| Bergamid | 26.6 | 0.0 | 27.7 | 0.0 | 0.0 | 19.4 | 8.8 | 0.0 | 8.9 | 0.0 | 26.7 | 0.0 | 0.0 | 9.0 |
| PB5104 | 2.7 | 3.4 | 2.8 | 4.4 | 3.0 | 2.5 | 1.4 | 1.4 | 0.9 | 0.9 | 4.3 | 2.7 | 0.9 | 1.4 |
| Impact Modifier | 4.0 | 4.0 | 0.0 | 0.0 | 2.8 | 0.0 | 1.3 | 0.7 | 0.7 | 1.3 | 2.0 | 2.0 | 0.0 | 0.0 |
| Stabilizer | 0.3 | 0.3 | 0.3 | 0.3 | 0.2 | 0.2 | 0.1 | 0.1 | 0.1 | 0.1 | 0.3 | 0.3 | 0.1 | 0.1 |
| Properties | | | | | | | | | | | | | | |
| Flexural Modulus (ASTM D790) (psi × 1000) | 285 | 276 | 339 | 297 | 255 | 283 | 227 | 220 | 220 | 215 | 276 | — | 243 | 244 |
| Notched Izod Impact Strength (ASTM D256) (ft * lb/in) @ 23° C. | 0.4 | 0.4 | 0.4 | 0.4 | 0.7 | 0.6 | 1.7 | 1.3 | 1.9 | 1.6 | 0.5 | — | 1.2 | 1.4 |
| Tensile Strength (ASTM D638) (psi × 1000) | 354 | 330 | 393 | 363 | 326 | 359 | 311 | 316 | 310 | 320 | 369 | — | 317 | 334 |

Table 5 shows the results of testing for heat deflection temperature under load using test method ASTM D648 at 66 psi (455 kPa) and 264 psi (1820 kPa).

TABLE 5

Nanocomposite Blend Test Results

| ASTM D648 Heat Deflection Temperature | 1 | A | 2 | B |
|---|---|---|---|---|
| 66 psi (455 kPa) | 106.05 | 103.3 | 115.65 | 108.75 |
| % Improvement | 3% | — | 6.3% | — |
| 264 psi (1820 kPa) | 69.25 | 65.6 | 81.2 | 76.85 |
| % Improvement | 5.5% | — | 5.6% | — |

The percent improvement shows the advantages of increasing thermal performance, e.g., heat deflection temperature via the compatibilized addition of a nanocomposite containing a higher heat deflection temperature polymer (in this case polyamide) to a lower heat deflection temperature nanocomposite (in this case polyolefin).

The invention is not limited to these embodiments. The claims follow.

What is claimed is:

1. A polymer blend, comprising (a) a polyolefin nanocomposite and (b) a polyamide nanocomposite,
    wherein the polyolefin nanocomposite comprises exfoliated nanoclay in polyolefin,
    wherein the polyolefin is selected from the group consisting of polyethylene, maleated polypropylene, polypropylene, polybutylene, polyhexene, polyoctene, copolymers thereof, and mixtures, blends or alloys thereof, and
    wherein one of the polymer nanocomposites (a) or (b) serves as the continuous phase and the other polymer nanocomposite (a) or (b) serves as the discontinuous phase.

2. The blend of claim 1, wherein the polyethylene includes low-density polyethylene (LDPE), high-density, high molecular weight polyethylene (HDPE), ultra-high molecular weight polyethylene (UHDPE), linear-low-density polyethylene (LLDPE), or very-low density polyethylene.

3. The blend of claim 2, wherein the polyolefin nanocomposite also includes an impact modifier.

4. The blend of claim 3, wherein the exfoliated nanoclay is montmorillonite.

5. The blend of claim 1, wherein the polyamide nanocomposite comprises exfoliated nanoclay in polyamide.

6. The blend of claim 5, wherein the polyamide nanocomposite also includes an impact modifier and a compatibilizer.

7. The blend of claim 5, wherein the exfoliated nanoclay is montmorillonite.

8. The blend of claim 1, further including flame retardants, impact modifiers, fillers, antioxidants, stabilizers, lubricants, pigments, biocides, and combinations thereof.

* * * * *